United States Patent
Dansui et al.

[11] Patent Number: 6,033,805
[45] Date of Patent: Mar. 7, 2000

[54] NICKEL-HYDROGEN SECONDARY BATTERY AND PROCESS FOR PRODUCING ELECTRODE THEREFOR

[75] Inventors: Yoshitaka Dansui, Fujisawa; Kenji Suzuki, Kamakura; Kohji Yuasa, Chigasaki, all of Japan

[73] Assignee: Matsushita Electric Industrial Co., Ltd., Osaka, Japan

[21] Appl. No.: 08/997,454

[22] Filed: Dec. 23, 1997

[30] Foreign Application Priority Data

| Dec. 26, 1996 | [JP] | Japan | 8-347286 |
| Aug. 29, 1997 | [JP] | Japan | 9-234308 |
| Dec. 4, 1997 | [JP] | Japan | 9-333852 |

[51] Int. Cl.$^7$ ..................................... H01M 4/32
[52] U.S. Cl. ................ 429/223; 429/218.2; 429/226; 429/206; 420/900
[58] Field of Search .................. 429/218.2, 223, 429/226, 206; 420/900

[56] References Cited

U.S. PATENT DOCUMENTS

| 4,251,603 | 2/1981 | Matsumoto et al. . | |
| 5,700,596 | 12/1997 | Ikoma et al. | 429/206 |
| 5,744,263 | 4/1998 | Inagaki et al. | 429/206 |
| 5,807,643 | 9/1998 | Yamamoto et al. | 429/101 |

FOREIGN PATENT DOCUMENTS

| 5036935 | 4/1975 | Japan . |

*Primary Examiner*—Stephen Kalafut
*Assistant Examiner*—Angela J. Martin
*Attorney, Agent, or Firm*—Stevens, Davis, Miller & Mosher, L.L.P.

[57] ABSTRACT

By using a thin film-formed positive electrode, and negative electrode and a film separator, the capacity density of the electrode plate can be improved and at the same time a nickel-hydrogen secondary battery with a higher capacity can be easily obtained; as a result a nickel-hydrogen secondary battery with a higher capacity density can be provided.

19 Claims, No Drawings

NICKEL-HYDROGEN SECONDARY BATTERY AND PROCESS FOR PRODUCING ELECTRODE THEREFOR

BACKGROUND OF THE INVENTION

The present invention relates to a nickel-hydrogen secondary battery. More particularly, it relates to structures of thin film type electrodes and of cells which use the electrode.

In recent years, with the spread of portable electronic equipment, development of alkaline batteries with higher capacity has been eagerly desired. In particular, nickel-hydrogen batteries, which are secondary batteries comprising a positive electrode consisting essentially of an active material containing nickel hydroxide as the main constituent and a negative electrode containing a hydrogen-absorbing alloy powder as the main constituent, are rapidly extending their use as secondary batteries with a high capacity and high reliability.

The positive electrode of alkaline batteries of prior art is described below.

The positive electrode of alkaline batteries can be broadly divided into the sintered type and the non-sintered type. The former electrode is produced, for example, by impregnating a porous sintered nickel substrate of a porosity of about 80% obtained by sintering nickel powder with a nickel salt solution, such as an aqueous nickel nitrate solution, and then immersing the impregnated substrate in an aqueous alkaline solution, thereby to form a nickel hydroxide active material in the porous sintered nickel substrate. This electrode has its limits in attaining high capacity because, since it is difficult to increase the porosity of the substrate further, the amount of the active material loaded cannot be increased further.

The latter non-sintered type positive electrode comprises, for example, as disclosed in JP-A-50-36935, a three-dimensionally continuous spongy porous substrate of a porosity of 95% or more formed essentially of nickel metal and nickel hydroxide of the active material filled in the substrate. This electrode is in wide use at present as the positive electrode of high capacity secondary batteries. In order to attain a higher capacity in the non-sintered type positive electrode, it has been proposed to fill spherical nickel hydroxide in the spongy porous substrate. In this proposal, spherical nickel hydroxide with a particle diameter of several $\mu$m to several ten $\mu$m is filled into the pores of the spongy porous substrate, which have a pore size of about 200–500 $\mu$m. In such a structure, the charge-discharge reaction proceeds smoothly in the nickel hydroxide which is in the vicinity of the nickel metal skeleton and in which the conductive network is maintained, but the reaction does not proceed sufficiently in the nickel hydroxide detached from the skeleton. In this non-sintered type positive electrode, therefore, in order to improve the utilization factor of nickel hydroxide filled into the substrate pores, a conductive agent is used besides nickel hydroxide of the active material thereby to connect the spherical nickel hydroxide particles electrically with one another. The conductive agents used are cobalt compounds, such as cobalt hydroxide and cobalt monoxide, metallic cobalt, metallic nickel, or the like. In this way, in the non-sintered type positive electrode, the active material can be filled in a high density, and hence a higher capacity can be attained than in sintered-type positive electrode.

Next, the negative electrode of nickel-hydrogen secondary batteries using a hydrogen absorbing alloy is described below. In general, alloys of $AB_5$ type or $AB_2$ are used as the negative electrode active material. $AB_5$ alloys are alloys of $LaNi_5$ type in which, usually, the moiety of La has been replaced by Mm (Misch metal) and the moiety of Ni has been replaced by such metals as Co, Mn, Al, Fe and Cr. Misch metals are alloys of lantanide type based on La.

Such negative electrodes are produced by a method which comprises pulverizing an alloy to a predetermined particle diameter, followed by classification, mixing the alloy powder with a conductive agent and a binder into a form of paste, and then coating the paste on a nickel-plated perforated metal plate, followed by drying and pressing to obtain an electrode plate.

In the non-sintered type positive electrode of the above-mentioned structure, however, the addition of a conductive agent is necessary and, moreover, dense filling of spherical nickel hydroxide into the three-dimensional cage-like space of the spongy porous substrate is difficult to attain, and resultantly the capacity density of the positive electrode plate is about 650 mAh/cc. Furthermore, since the substrate itself has a nickel skeleton with a thickness of about 30 $\mu$m, when the electrode is used, for example, to construct a cylindrical nickel-hydrogen secondary battery, sometimes broken parts are developed in the skeleton by the bending force applied in winding the electrode plate spirally, and the tip of the broken skeleton pierces through the separator to cause short-circuit with the negative electrode.

SUMMARY OF THE INVENTION

In view of the above-mentioned problems, the main object of the present invention is to provide a nickel-hydrogen secondary battery with a high energy density by improving the electrode plate.

To solve the above-mentioned problems, the nickel-hydrogen secondary battery according to the present invention has a structure which comprises a positive electrode comprising nickel foil and an active material layer consisting essentially of nickel hydroxide solid solution powder formed on the foil surface, a negative electrode comprising nickel foil and a hydrogen absorbing alloy powder layer formed on the foil surface, and a porous separator formed essentially of a polymer resin.

By virtue of the above-mentioned structure, nickel hydroxide of the positive electrode active material can be loaded in a larger amount on the nickel foil of the substrate and, moreover, since it is in the form a thin film, the conductivity of the active material can be maintained merely by adding thereto a minimum amount of a conductive agent, and resultantly the amount of the positive electrode active material can be relatively increased to raise the energy density. Moreover, since the electrode is a thin film electrode in which foil is used as the substrate, neither the breaking of the skeleton due to bending nor the piercing through of the separator by the broken part occurs. Furthermore, since the negative electrode plate is also a thin film electrode using foil as the substrate, the amount of the conductive agent to be added to the negative electrode active material also can be reduced. As a Result the amount of the active materials of the nickel-hydrogen secondary battery as a whole can be increased, making it possible to attain a high capacity.

DESCRIPTION OF THE PREFERRED EMBODIMENTS

A first aspect of the present invention relates to a nickel-hydrogen secondary battery which has a structure comprising a positive electrode comprising nickel foil and an active material layer consisting essentially of nickel hydroxide solid solution powder formed on the foil surface, a negative electrode comprising nickel foil and a hydrogen absorbing alloy powder layer formed on the foil surface, and a porous separator formed essentially of a polymer resin. The thickness of the nickel foil is preferably 5–20 µm.

A second aspect of the present invention specifies the thickness of the active material layer formed essentially of nickel hydroxide solid solution powder. From the viewpoints of the current-collecting ability and the capacity density of the positive electrode, the thickness is preferably 10–60 µm on one side of the nickel foil surface.

A third aspect of the present invention specifies the thickness of the hydrogen absorbing alloy powder layer formed on the both sides of the nickel foil, the thickness being 19–50 µm on one side of the nickel foil surface.

A fourth aspect of the present invention specifies the separator, which is a porous film or a nonwoven fabric of a polyolefin resin such as polyethylene and/or polypropylene, and has a porosity of 40% or more. Though the separator may be either of film or of nonwoven fabric, a film-formed separator is preferable to obtain a more enhanced thin film structure. Film is less deformed by compressive stress than nonwoven fabric, so that even when the positive electrode and negative electrode become swollen, the amount of liquid retained by a separator made of film does not decrease materially. Moreover, a film-formed separator has a high gas permeability and hence can suppress the increase of internal pressure the battery.

A fifth aspect of the present invention relates to a nickel-hydrogen battery which comprises a positive electrode comprising nickel foil and a powdery substance consisting mainly of nickel hydroxide held on the foil surface, a negative electrode consisting mainly of hydrogen absorbing alloy powder, an alkaline electrolyte and a separator, said powdery substance of the positive electrode comprising as the main constituent a nickel hydroxide powder with an average particle diameter of 1 µm or less containing as solid solution at least one element selected from the group consisting of Co, Zn, Mn, Ca, Cr, Al and Fe, and 1–10% by weight of a cobalt compound powder with an average particle diameter of 1 µm or less admixed with the nickel hydroxide powder. The nickel hydroxide powder containing the above-mentioned metal element as solid solution has an average particle diameter of 1 µm or less, with which a cobalt compound powder with an average particle diameter of 1 µm or less is admixed as a conductive agent in an amount of 1–10% by weight relative to the nickel hydroxide powder. Consequently, difference in particle diameters between the two kinds of powder is very small, and the cobalt compound can disperse uniformly among nickel hydroxide powder particles to form a good conductive network. Moreover, the nickel hydroxide powder can be made to discharge from the surface to the innermost part thereof. Resultantly the capacity density of the positive electrode can be increased.

A sixth aspect of the present invention specifies the cobalt compound used as the conductive agent. The compound preferably consists essentially of cobalt hydroxide or cobalt oxide alone or both of them.

A seventh aspect of the present invention relates to a battery which comprises a positive electrode comprising nickel foil and a powdery substance containing nickel hydroxide as the main constituent held on the foil surface, a negative electrode containing hydrogen absorbing alloy powder as the main constituent, an alkaline electrolyte and a separator, said powdery substance of the positive electrode comprising as the main constituent a nickel hydroxide powder with an average particle diameter of 1 µm or less containing as solid solution at least one element selected from the group consisting of Co, Zn, Mn, Ca, Cr, Al and Fe, and 1–10% by weight of a cobalt compound powder with an average particle diameter of 1 µm or less admixed with the nickel hydroxide powder, the nickel hydroxide powder having a crystallite size of 100 nm or less in the direction parallel to the direction of a form <100>and 500 nm or less in the direction parallel to the direction of a form <001>plane. The reason or specifying the size of crystallites which form the above-mentioned nickel hydroxide powder containing a metal as solid solution is that when the crystallite size is larger than the dimension specified above, efficiency in charge-discharge tends to be low and the improvement of utilization factor tends to be difficult to recognize.

An eighth aspect of the present invention relates to a battery which comprises a positive electrode comprising nickel foil and a powdery substance containing nickel hydroxide as the main constituent held on the foil surface, a negative electrode containing hydrogen absorbing alloy powder as the main constituent, an alkaline electrolyte and a separator, the powdery substance of the positive electrode containing as solid solution at least one element selected from the group consisting of Co, Zn, Mn, Ca, Cr, Al and Fe, the amount of the element contained as solid solution being 1–10% by mol. The amount of the element is specified because, since it is generally considered that an element in solid solution basically does not participate in charge-discharge reaction, increase in the amount of element in solid solution, which relatively reduces the nickel content, results in a lower energy density. Thus the amount has its upper limit.

A ninth aspect of the present invention relates to a process for producing a positive electrode, which comprises immersing nickel foil in an aqueous solution containing nickel nitrate and at least one nitrate selected from the group of nitrates consisting of manganese nitrate, iron nitrate, aluminum nitrate, chromium nitrate, calcium nitrate, lanthanum nitrate, copper nitrate, titanium nitrate, magnesium nitrate, yttrium nitrate, silver nitrate, cobalt nitrate and zinc nitrate and forming an active material in the form of thin film on the nickel foil surface by means of electrolytic deposition. The thin film formed by electrolytic deposition tends little to develop pores in the film and hence makes it possible to form a high density active material layer.

A tenth aspect of the present invention relates to a treatment applied after an active material layer of thin film has been formed on nickel foil, the treatment comprising the step of impregnating the active material layer with an aqueous solution of at least one salt selected from the group consisting of the nitrates, sulfates and chlorides of nickel, manganese, iron, aluminum, chromium, calcium, lanthanum, copper, titanium, magnesium, yttrium, silver, cobalt and zinc and the subsequent step of treating the impregnated active material layer with an alkali hydroxide. Since the thin film thus formed is not a film constituted of a single crystal, the above-mentioned metals introduced into the space between crystals serve as a conductive agent or a substance which raises oxygen-generating voltage and thus can improve the utilization factor and characteristic properties of the thin film active material.

An eleventh aspect of the present invention relates to a treatment applied after an active material of thin film has been formed on nickel foil, the treatment comprising, subsequently to the formation of the active material layer, immersing the active material layer in an aqueous solution of at least one nitrate selected from the group of nitrates consisting of nickel nitrate, manganese nitrate, iron nitrate, aluminum nitrate, chromium nitrate, calcium nitrate, lanthanum nitrate, copper nitrate, titanium nitrate, magnesium nitrate, yttrium nitrate, silver nitrate, cobalt nitrate and zinc nitrate to perform electrolytic deposition, whereby the metals of the above-mentioned salts are made to exist on the surface of the thin film active material layer as a conductive agent or a substance which raises oxygen-generating voltage, and resultantly the utilization factor and characteristic properties of the thin film active material layer are improved.

A twelfth aspect of the present invention relates to a process for producing a thin film electrode which comprises the step of forming a conductive film on the surface of active material powder consisting essentially of a spherical nickel hydroxide solid solution with an average particle diameter of 15 $\mu$m or less, the step of mixing the active material and a hydrocarbon polymer into the form of paste, the step of coating the paste on nickel foil and the step of rolling the coated nickel foil. In this process, since a conductive material has been applied onto the surface of the active material, the addition of a conductive agent other than the active material is unnecessary and an active material with a high density can be obtained.

A thirteenth aspect of the present invention relates to a process for producing a negative electrode, which comprises the step of mixing spherical hydrogen absorbing alloy powder with an average particle diameter of 15 $\mu$m or less coated with nickel, a hydrocarbon polymer and a carbonaceous material or metallic nickel powder to prepare a paste, the step of coating the paste on nickel foil, and the step of rolling the coated nickel foil. Heretofore, hydrogen absorbing alloy powder, as its particle diameter decreases, is apt to be corroded and resultantly to lower its hydrogen-occlusion capacity. According to the present process, however, a hydrogen absorbing alloy powder surface-coated with nickel, which has a high alkali resistance, is used and hence the hydrogen absorbing capacity is not lowered.

A fourteenth aspect of the present invention also relates to a process for producing a negative electrode, in which hydrogen absorbing alloy powder with an average particle diameter of 15 $\mu$m or less coated with nickel is used. The hydrogen absorbing occlusion alloy powder used herein is not limited to spherical hydrogen absorbing alloy described in claim 11 but may also be non-spherical powder obtained, for example, by grinding cast hydrogen absorbing alloy, followed by sizing.

A fifteenth aspect of the present invention relates to a typical process for producing a negative electrode, which comprises the step of forming a thin film layer of a hydrogen absorbing alloy described below on nickel foil by means of sputtering using as the target an $AB_5$ type hydrogen absorbing alloy comprising a Misch metal consisting essentially of La, Ce, Pr, Nd and Sm as the A-site and Ni, Co, Mn and Al as the B-site, and the step of annealing the nickel foil having the hydrogen absorbing alloy layer formed thereon. Since the hydrogen absorbing alloy layer is formed by means of sputtering, the addition of conductive agents and additives for bonding hydrogen absorbing alloy which has been required in previous coating-type negative electrode becomes utterly unnecessary and a high density loading of the active material becomes possible.

A sixteenth aspect of the present invention relates to a process which comprises the step of forming a thin film layer of a hydrogen absorbing alloy described below on nickel foil by means of sputtering using as the target $AB_5$ type hydrogen absorbing alloy comprising La, Ni, Co, Mn and Al, and the step of annealing the nickel foil having the hydrogen absorbing alloy layer formed thereon. Thus, the process is a process wherein the Misch metal which is one of the constituents of the hydrogen absorbing alloy described in claim 27 is replaced by La. It gives a negative electrode with characteristic properties equal to those obtained by the process described in claim 27.

A seventeenth aspect of the present invention relates to a process which comprises the step of forming a thin film layer of hydrogen absorbing alloy on nickel foil by means of sputtering using an alloy comprising La, Co, Mn and Al as the target and the step of annealing the nickel foil having the hydrogen absorbing alloy layer formed thereon. By annealing, the nickel foil forms an alloy with la, Co, Mn and Al, thereby to change itself into a negative electrode active material.

An eighteenth aspect of the present invention relates to a process which comprises the step of mixing the nitrate, sulfates or chlorides of La, Ni, Co, Mn and Al in a predetermined mixing ratio to prepare an aqueous solution of the mixture, the step of performing electrolytic plating on nickel foil in the aqueous solution prepared above and the step of annealing the nickel foil having a plating thin film formed thereon. The plating film comprising La, Ni, Co, Mn and Al as the main constituents formed on the nickel foil is turned into a negative electrode active material by annealing.

A nineteenth aspect of the present invention relates to a process which comprises the step of mixing the nitrates, sulfates or chlorides of La, Co, Mn and Al in a predetermined mixing ratio to prepare an aqueous solution of the mixture, the step of performing electrolytic plating on nickel foil in the aqueous solution prepared above and the step of annealing the nickel foil having a plating thin film formed thereon. By annealing, the nickel foil forms an alloy with La, Co, Mn and Al to turn into a negative electrode active material.

A twentieth aspect of the present invention relates to a process which comprises the step of melting a Misch metal comprising La, Ce, Pr, Nd and Sm, and Ni, Co, Mn and Al in a melting furnace, the step of rapidly quenching the molten body in an inert gas atmosphere by the single roll method or the twin roll method to obtain a thin film, the step of mixing minute strips of the thin film obtained, a hydrocarbon polymer, and a carbonaceous material or metallic nickel powder to form a paste, the step of coating the paste on nickel foil and the step of rolling the coated nickel foil. In this process, thin film in the form of strips about 10 $\mu$m in thickness is coated on nickel thin film, so that the process also makes it possible to attain high density loading of the active material.

Embodiment of the invention in the form of battery

A nickel-hydrogen secondary battery useful in practice, which uses the above-mentioned positive electrode comprising nickel foil and an active material layer consisting essentially of nickel hydroxide solid solution powder formed on the nickel foil surface, the above-mentioned negative electrode comprising nickel foil and a hydrogen absorbing alloy layer formed on the nickel foil surface, and, as a separator, porous thin film or nonwoven fabric formed essentially of a polymer resin, can be formed by arranging the separator so as to insulate the positive electrode plate from the negative electrode, winding the whole spirally to form an electrode plate assembly, putting the assembly in a battery case, then pouring a prescribed amount of electrolyte into the case, and sealing the case opening with a sealing plate.

EXAMPLES

Example 1

A nickel foil 10 μm in thickness, 60 mm in width and 1000 mm in length was used as the substrate. The surface of an active material consisting essentially of spherical nickel hydroxide with an average particle diameter of 15 μm containing cobalt and zinc as solid solution was coated with trivalent cobalt oxyhydroxide to obtain an active material powder. To the active material powder were added 1 wt. % of polytetrafluoroethylene (PTFE) and water to prepare a paste. The paste was coated on the both surfaces of the nickel foil, then dried, and the coated foil was rolled. The electrode thickness after rolling was adjusted to 100 μm. The electrode obtained had a theoretical capacity of 4660 mAh (calculated on the assumption that nickel hydroxide undergoes one electron reaction and hence yields 289 mAh/g).

Then, a negative electrode was obtained by coating on a nickel foil 10 μm in thickness, 60 mm in width and 1025 mm in length a paste prepared by mixing an $AB_5$ type hydrogen absorbing alloy powder with an average particle diameter of 15 μm or less surface-coated with nickel, 1 wt. % of a carbonaceous material, 1 wt. % of PTFE and water, then drying the paste and rolling the coated foil. The electrode obtained after rolling had a thickness of 66 μm. The electrode had a theoretical capacity of 6291 mAh.

As a separator was used a polyethylene porous film. The separator used had a thickness of 10 μm, width of 62 mm and length of 1075 mm and had a porosity of 50%.

The above-mentioned positive electrode, negative electrode and separator were arranged in the order of positive electrode, separator, negative electrode and separator and the whole was wound spirally to form an electrode plate assembly. The assembly was put in a battery case 17 mm in diameter and 67 mm in height, then a prescribed amount of alkaline electrolyte was poured into the battery case, and the battery opening was sealed with a sealing plate to form a closed type nickel absorbing secondary battery.

The battery obtained was charged at 450 mA for 15 hours, then allowed to stand for 1 hour, and then discharged at 900 mA until the discharge voltage reached 1 V. This cycle was performed two times, and then the battery was aged at 45° C. After aging, the battery was charged at 450 mA for 15 hours, allowed to stand for 1 hour, and then discharged at 900 mA until the discharge voltage reached 1 V to determine discharge capacity. The utilization factor (percentage ratio of actual discharge capacity to positive electrode theoretical capacity) calculated from the discharge capacity obtained above as 97%.

In the above-mentioned positive electrode, spherical nickel hydroxide powder with an average particle diameter containing cobalt and zinc as solid solution which had been surface-coated with trivalent cobalt oxyhydroxide was used as the active material. Besides this electrode, other electrodes prepared as described below may also be used: nickel foil used as the substrate is immersed in an aqueous solution containing nickel nitrate and, in admixture therewith, at least one nitrate selected from the group of nitrates consisting of manganese nitrate, iron nitrate, aluminum nitrate, chromium nitrate, calcium nitrate, lanthanum nitrate, copper nitrate, titanium nitrate, magnesium nitrate, yttrium nitrate, silver nitrate, cobalt nitrate and zinc nitrate, and a thin film active material is formed on the surface of the foil of the substrate by means of electrolytic deposition; or, further, the nickel foil having the thin film active material formed thereon as described above is impregnated with an aqueous solution of a salt selected from the group consisting of the nitrate, sulfates and chlorides of nickel, manganese, iron, aluminum, chromium, calcium, lanthanum, copper, titanium, magnesium, yttrium, silver, cobalt and zinc, and then treated with an alkali hydroxide to form a hydroxide of any of the above-mentioned elements on the surface of the thin film-formed active material layer; or an electrode which has, on the surface of thin film active material layer formed as described above, further a metal layer obtained, for example, by electrolytic deposition in an aqueous solution of a nitrate selected from the group of nitrates consisting of nickel nitrate, manganese nitrate, iron nitrate, aluminum nitrate, chromium nitrate, calcium nitrate, lanthanum nitrate, copper nitrate, titanium nitrate, magnesium nitrate, yttrium nitrate, silver nitrate, cobalt nitrate and zinc nitrate.

By using the thin film-formed positive electrode, negative electrode and porous film separator, the capacity density of the electrode plate can be improved and at the same time a nickel-hydrogen secondary battery with higher capacity can be obtained.

Example 2

Spherical nickel hydroxide powder with an average particle diameter of 15 Am containing cobalt and zinc as solid solution (300 g), cobalt hydroxide aggregate powder with an average particle diameter of 0.2 μm (30 g) and water (300 g) were mixed to obtain a suspension. The nickel hydroxide used contained 2 mol % of cobalt as its hydroxide and 6 mol % of zinc as its hydroxide, respectively as solid solution. The suspension obtained above was mixed and ground in a wet grinder into the form of paste. The paste was measured for its powder particle diameter with a wet-type laser interference particle size distribution analyzer. The average particle diameter was found to be 0.2 μm. The paste was coated on the both sides of nickel foil 20 μm in thickness, then dried and the coated foil was rolled to obtain a positive electrode plate 120 μm in thickness. The electrode had a theoretical capacity of 1300 mAh (calculated on the assumption that nickel hydroxide undergoes one electron reaction and hence yields 289 mAh/g).

A negative electrode was prepared by coating on nickel foil a paste prepared by mixing an $AB_5$ type hydrogen absorbing alloy powder, 1 wt. % of a carbonaceous material, 1 wt. % of PTFE and water, then drying the paste, and rolling the coated foil to a thickness of 100 μm. The electrode obtained had a theoretical capacity of 1900 mAh.

As the separator was used a polypropylene nonwoven fabric 20 μm in thickness. The above-mentioned positive electrode, negative electrode and separator were arranged in the order of positive electrode, separator, negative electrode and separator. The whole was wound spirally, put in an AA-size battery case, a prescribed amount of alkaline electrolyte was poured into the case, and the case was sealed with a sealing plate to form a closed type nickel-hydrogen secondary battery.

The battery was charged at 130 mA for 15 hours, allowed to stand for 1 hour, and then discharged at 260 mA until the discharge voltage reached 1 V. This cycle was performed two times, and then the battery was aged at 45° C. After aging, the battery was charged at 130 mA for 15 hours, allowed to stand for 1 hour, and then discharged at 260 mA until the discharge voltage reached 1 V, to determine discharge capacity. The utilization factor (percentage ratio of actual discharge capacity to positive electrode theoretical capacity) calculated from the discharge capacity obtained above was 103%.

Though cobalt and zinc were used herein as the element to be contained in nickel hydroxide as solid solution, similar effects were obtained by using at least one element selected from the group consisting of cobalt, zinc, manganese, calcium, chromium, aluminum and iron. The amount of the element to be contained as solid solution is preferably not less than 1 mol % and not more than 10 mol % as hydroxides.

Though cobalt hydroxide were used with nickel hydroxide solid solution particles as the materials for forming the above-mentioned paste, cobalt oxide alone, or the mixture of cobalt hydroxide and cobalt oxide may also be used for forming a paste.

Example 3

Spherical nickel hydroxide powder with an average particle diameter of 10 $\mu$m containing 5 mol % of manganese as solid solution (300 g), cobalt hydroxide aggregate powder with an average particle diameter of 0.2 $\mu$m (30 g) and water (330 g) were mixed to obtain a suspension. The suspension was mixed and ground with a wet grinder into the form of paste. The paste was measured for its powder particle diameter with a wet-type laser interference particle size distribution analyzer to find an average particle diameter of 0.2 $\mu$m. The paste was incorporated with 5 wt. % of PTFE based on the weight of solid of the paste, then coated on the both sides of nickel foil, dried and the coated foil was rolled to obtain a positive electrode plate. The nickel foil used had a thickness of 20 $\mu$m and the positive electrode plate after rolling had a thickness of about 120 $\mu$m. The electrode had a theoretical capacity of 1300 mAh (calculated on the assumption that nickel hydroxide undergoes one electron reaction and yields 289 mAh/g).

A negative electrode was prepared by coating on the both sides of nickel foil a paste prepared by mixing an $AB_5$ type hydrogen absorbing alloy, 1 wt. % of a carbonaceous material, 1 wt. % of PTFE and water, drying the paste and rolling the coated foil. The electrode after rolling had a thickness of 100 $\mu$m and had a theoretical capacity of 1900 mAh.

As the separator was used polyethylene porous film. The separator had a thickness of 21 $\mu$m.

The above-mentioned positive electrode, negative electrode and separator were arranged in the order of positive electrode, separator, negative electrode and separator, and the whole was wound serially to form an electrode plate assembly. The assembly was put in an AA-size battery case, a prescribed amount of alkaline electrolyte was poured into the case, and the case was sealed with a sealing plate to form a closed type nickel-hydrogen secondary battery.

The battery was charged at 130 mA for 15 hours, allowed to stand for 1 hour, and then discharged at 260 mA until the discharge voltage reached 1 V. This cycle was performed two times, and the battery was aged at 45° C. After aging, the battery was charged at 130 mA for 15 hours, allowed to stand for 1 hour and then discharged at 260 mA until the discharge voltage reached 1 V, to determine the discharge capacity. The utilization factor (percentage ratio of actual discharge capacity to positive electrode theoretical capacity) calculated from the discharge capacity obtained above was 105%.

Thus, by decreasing the particle size of the active material and thereby improving its uniform dispersion with a conductive agent, the charge-discharge efficiency as an electrode and resultantly the utilization factor of the active material are improved, and a nickel-hydrogen secondary battery with a higher capacity can be obtained.

The analysis of the nickel hydroxide powders used in Examples 1, 2 and 3 showed that they were all polycrystalline and the crystallites had a size of 100 nm or less in the direction parallel to the direction of a form <100> and 500 nm or less in the direction parallel to the direction of a form <001>.

Example 4

Description is given below of a process for producing a negative electrode which can be used as the negative electrode of the nickel-hydrogen secondary batteries of Examples 1, 2, and 3.

Sputtering was conducted in an Ar gas atmosphere using as the target an $AB_5$ type hydrogen absorbing alloy which comprises a Misch metal consisting essentially of La, Ce, Pr, Nd, Sm, etc., and Ni, Co, Mn, Al, etc. and using nickel foil as the substrate, to form the $AB_5$ type hydrogen absorbing alloy on the nickel foil surface. Thereafter, annealing was performed at about 1100° C. for a predetermined time. As the pre-treatment for sputtering, the nickel foil surface was washed with an acid, such as hydrochloric acid or dilute hydrofluoric acid, to remove nickel oxide of the surface.

The substrate surface was subjected to Ar sputtering before forming the hydrogen absorbing alloy layer mentioned above, in order to improve adhesion of the alloy to the substrate. The amount of the hydrogen absorbing alloy to be deposited is determined according to the capacity required for the electrode plate, but since it is difficult to deposit a layer of a thickness of 10 $\mu$m or more at a time, deposition and annealing were repeated alternately to obtain a thin film with a desired thickness. The nickel foil used had a thickness of 10 $\mu$m.

An $AB_5$ type hydrogen absorbing alloy comprising La, Ni, Co, Mn and Al may also be used as the target for supplying hydrogen absorbing alloy.

A negative electrode may also be used which is prepared by conducting sputtering using as the substrate nickel foil 65 Am in thickness and as the target a La, Co, Mn, Al alloy to deposit the alloy on the substrate, and then conducting heat treatment to effect diffusion of the deposited alloy into the substrate and thereby to effect alloying of the alloy with the substrate.

Nickel-hydrogen secondary batteries were constructed by combining the above-mentioned negative electrode plates respectively with the positive electrode and separator of Example 1. In using any of the negative electrodes, the utilization factor of the active material was 97% or more, and a capacity of 4500 mAh could be obtained.

Thus, by using a thin film-formed positive electrode and negative electrode and a film separator, the capacity density of the electrode plate can be improved, and nickel-hydrogen secondary batteries with a higher capacity can be obtained.

Example 5

Description is given below of another process for producing a hydrogen absorbing alloy negative electrode which can be used as the negative electrode of the nickel-hydrogen secondary batteries of Examples 1, 2 and 3.

An aqueous solution was prepared by mixing the nitrates of La, Ni, Co, Mn and Al in a predetermined mixing ratio. Nickel foil was immersed in the aqueous solution, and electroplating of La, Ni, Co, Mn and Al was conducted with the foil as the negative electrode. The nickel foil used had a thickness of 10 $\mu$m. After the deposition of plating film, annealing was conducted at about 1100° C. to effect alloying of the plating with the substrate.

Separately, nickel foil 65 μm in thickness was prepared as the substrate, while an aqueous solution was prepared by mixing the nitrates of La, Co, Mn and Al in a predetermined mixing ratio. Electro-plating was conducted in the aqueous La, Co, Mn and Al solution using the nickel foil as the negative electrode. After the deposition of plating film, heat treatment was conducted at about 1100° C. to effect diffusion of the deposited alloy into the substrate and thereby to effect alloying of the alloy with the nickel foil.

Nickel-hydrogen secondary batteries were constructed by combining the above-mentioned two kinds of negative electrode plate respectively with the positive electrode and separator of Example 1. In using either of the negative electrodes, the utilization factor was 97% or more, and a capacity of 4,500 mAh could be obtained.

Example 6

Description is given below of a still other process for producing a negative electrode which can be used as the negative electrode of the nickel-hydrogen secondary batteries of Examples 1, 2, and 3.

A Misch metal comprising La, Ce, Pr, Nd, Sm, etc. and a metal comprising Ni, Co, M, Al, etc. were mixed in a predetermined mixing ratio, and molten in a melting furnace. The molten body was rapidly quenched in an inert gas by the single roll method to form a strip-formed alloy about 5 μm in thickness and about 20–70 μm in width. The alloy was annealed at about 1100° C. The strips obtained was mixed with 1 wt. % of a carbonaceous material, 1 wt. % of PTFE and a suitable amount of water into the form of paste. The paste was coated on nickel foil 10 μm in thickness, 60 mm in width and 1025 mm in length, then dried, and the coated foil was rolled. The resulting electrode after rolling had a thickness of 65 μm. The electrode had a theoretical capacity of 6,200 mAh. The negative electrode plate was combined with the positive electrode and separator of Example 1 to construct a nickel-hydrogen secondary battery. In using any of the negative electrodes, the utilization factor was 97% or more, and a capacity of 4500 mAh could be obtained.

As set forth above, the nickel-hydrogen secondary battery according to the present invention has a structure which comprises a positive electrode comprising nickel foil and an active material consisting essentially of nickel hydroxide solid solution powder formed on the foil surface, a negative electrode comprising nickel foil and a hydrogen absorbing alloy powder layer formed on the foil surface, and a separator formed essentially of a polymer resin. By virtue of the above-mentioned structure, nickel hydroxide of the positive electrode active material can be loaded in a larger amount on the nickel foil of the substrate and, moreover, since it is in the form of film, the conductivity of the active material can be maintained merely by adding a minimum amount of a conductive agent thereto, and as a result the amount of active material can be relatively increased to raise energy density. Moreover, since the electrode is a thin film electrode, neither the breaking of the substrate skeleton due to bending nor piercing of a protracting tip through the separator occurs. Furthermore, when the negative electrode plate is also a thin film-formed electrode, the amount of the conductive agent to be added to the negative electrode active material also can be reduced. Thus, a nickel-hydrogen secondary battery with a high capacity density can be provided.

We claim:

1. A nickel-hydrogen secondary battery comprising a positive electrode comprising a first nickel foil and an active material layer consisting essentially of nickel hydroxide solid solution powder formed on a surface of the first nickel foil, a negative electrode comprising a second nickel foil and a hydrogen absorbing alloy powder layer formed on a surface of the second nickel foil, and a porous separator consisting essentially of a polymer resin.

2. The nickel-hydrogen secondary battery according to claim 1 wherein said surface of the first nickel foil having the active material layer formed thereon comprises both sides of the first nickel foil, the thickness of the active material layer being 10–60 μm on one of said sides of the first nickel foil.

3. The nickel-hydrogen secondary battery according to claim 1 wherein said surface of the second nickel foil having the hydrogen absorbing alloy powder layer formed thereon comprises both sides of the second nickel foil, the thickness of the hydrogen absorbing alloy powder layer being 19–50 μm on one of said sides of the second nickel foil.

4. The nickel-hydrogen secondary battery according to claim 1 wherein the separator consists essentially of a porous film or nonwoven fabric of polyolefin resin and has a porosity of 40% or more.

5. A nickel-hydrogen secondary battery comprising a positive electrode comprising a nickel foil and a layer of powdery substance consisting mainly of nickel hydroxide formed on a surface of the nickel foil, a negative electrode consisting mainly of hydrogen absorbing alloy powder, an alkaline electrolyte and a separator, said powdery substance of the positive electrode comprising as its main constituent a nickel hydroxide powder with an average particle diameter of 1 μm or less containing as solid solution at least one element selected from the group consisting of Co, Zn, Mn, Ca, Cr, Al and Fe, and 1–10% by weight, relative to the nickel hydroxide powder, of a cobalt compound powder with an average particle diameter of 1 μm or less admixed with the nickel hydroxide powder.

6. The nickel-hydrogen secondary battery according to claim 5, wherein the cobalt compound is cobalt hydroxide, cobalt oxide, or a mixture of cobalt hydroxide and cobalt oxide.

7. The nickel-hydrogen secondary battery according to claim 5 wherein said surface of the nickel foil having said layer formed thereon comprises both sides of the nickel foil, the thickness of said layer being 10–60 μm on one of said sides of the nickel foil.

8. The nickel-hydrogen secondary battery according to claim 5 wherein said surface of the nickel foil having said layer formed thereon comprises both sides of said nickel foil, the thickness of said layer being 19–50 μm on one of said sides of the nickel foil.

9. The nickel-hydrogen secondary battery according to claim 5 wherein the separator consists essentially of a porous film or nonwoven fabric of polyolefin resin and has a porosity of 40% or more.

10. A nickel-hydrogen secondary battery comprising a positive electrode comprising a nickel foil and a layer of a powdery substance consisting mainly of nickel hydroxide formed on a surface of the nickel foil, a negative electrode consisting mainly of hydrogen absorbing alloy powder, an alkaline electrolyte and a separator, said powdery substance of the positive electrode comprising as its main constituent a nickel hydroxide powder with an average particle diameter of 1 μm or less containing as solid solution at least one element selected from the group consisting of Co, Zn, Mn, Ca, Cr, Al and Fe, and 1–10% by weight relative to the nickel hydroxide powder, of a cobalt compound powder with an average particle diameter of 1 μm or less admixed with the nickel hydroxide powder, said nickel hydroxide powder having a crystallite size of 100 nm or less in the direction parallel to the <100> plane and 500 nm or less in the direction parallel to the <001> plane.

11. The nickel-hydrogen secondary battery according to claim 10, wherein the cobalt compound is cobalt hydroxide, cobalt oxide, or a mixture of cobalt hydroxide and cobalt oxide.

12. The nickel-hydrogen secondary battery according to claim 10 wherein said surface of the nickel foil having said layer formed thereon comprises both sides of the nickel foil, the thickness of said layer being 10–60 μm on one of said sides of the nickel foil.

13. The nickel-hydrogen secondary battery according to claim 10 wherein said surface of the nickel foil having said layer formed thereon comprises both sides of the nickel foil and has a thickness of 19–50 μm on one of said sides of the nickel foil.

14. The nickel-hydrogen secondary battery according to claim 10 wherein the separator consists essentially of a porous film or nonwoven fabric of polyolefin resin and has a porosity of 40% or more.

15. A nickel-hydrogen secondary battery comprising a positive electrode comprising a nickel foil and a layer of a powdery substance consisting mainly of nickel hydroxide formed on a surface of the nickel foil, a negative electrode consisting mainly of hydrogen absorbing alloy powder, an alkaline electrolyte and a separator, said powdery substance of the positive electrode comprising as its main constituent nickel hydroxide powder with an average particle diameter of 1 μm or less containing as solid solution 1–10 mol % of at least one element selected from the group consisting of Co, Zn, Mn, Ca, Cr, Al and Fe, and 1–10% by weight, relative to the nickel hydroxide powder, of at least one member selected from the group consisting of cobalt hydroxide and cobalt oxide powder with an average diameter of 1 μm or less admixed with the nickel hydroxide powder, the nickel hydroxide powder having a crystallite size of 100 nm or less in the direction parallel to the direction of a form <100> and 500 nm or less in the direction parallel to the direction of a form <001>.

16. The nickel-hydrogen secondary battery according to claim 15 wherein said surface of the nickel foil having said layer formed thereon comprises both sides of the nickel foil and has a thickness of 10–60 μm on one of said sides of the nickel foil.

17. The nickel-hydrogen secondary battery according to claim 15 wherein said surface of the nickel foil having said layer formed thereon comprises both sides of the nickel foil and has a thickness of 19–50 μm on one of said sides of the nickel foil.

18. The nickel-hydrogen secondary battery according to claim 15 wherein the separator consists essentially of a porous film of polyolefin resin and has a porosity of 40% or more.

19. The nickel-hydrogen secondary battery according to claim 1, wherein the nickel hydroxide solid solution powder is surface-coated with trivalent cobalt oxyhydroxide.

* * * * *